United States Patent
Ebrahimi Afrouzi

(10) Patent No.: US 10,690,457 B2
(45) Date of Patent: Jun. 23, 2020

(54) METHOD AND APPARATUS FOR OVEREXPOSING IMAGES CAPTURED BY DRONES

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 43 days.

(21) Appl. No.: 15/963,710

(22) Filed: Apr. 26, 2018

(65) Prior Publication Data

US 2019/0331465 A1   Oct. 31, 2019

(51) Int. Cl.
| | | |
|---|---|---|
| *G08G 5/00* | (2006.01) | |
| *G08B 25/14* | (2006.01) | |
| *B64C 39/02* | (2006.01) | |
| *H04W 4/02* | (2018.01) | |
| *F41H 13/00* | (2006.01) | |
| *G06K 9/66* | (2006.01) | |
| *H04N 5/232* | (2006.01) | |
| *H04N 5/225* | (2006.01) | |

(52) U.S. Cl.
CPC ........... *F41H 13/0087* (2013.01); *G06K 9/66* (2013.01); *H04N 5/2252* (2013.01); *H04N 5/2256* (2013.01); *H04N 5/23238* (2013.01)

(58) Field of Classification Search
CPC .... F41H 13/0087; G06K 9/66; H04N 5/2252; H04N 5/2256; H04N 5/23238
USPC .......................................................... 348/135
See application file for complete search history.

(56) References Cited

U.S. PATENT DOCUMENTS

| | | | |
|---|---|---|---|
| 9,529,360 B1 | 12/2016 | Melamed et al. | |
| 2009/0129420 A1* | 5/2009 | Regaard | H01S 5/4012 372/50.12 |
| 2013/0169801 A1* | 7/2013 | Martin | H04N 5/23206 348/143 |
| 2015/0348580 A1* | 12/2015 | van Hoff | G11B 19/20 348/38 |
| 2017/0092138 A1* | 3/2017 | Trundle | B64C 39/024 |
| 2018/0137642 A1* | 5/2018 | Malisiewicz | G06T 7/11 |
| 2018/0267545 A1* | 9/2018 | Goto | G05D 1/0212 |
| 2018/0359403 A1* | 12/2018 | Zhang | H04N 5/2354 |
| 2018/0364662 A1* | 12/2018 | Meganathan | G05B 19/042 |
| 2019/0170318 A1* | 6/2019 | Buzzurro | F21S 43/237 |

* cited by examiner

*Primary Examiner* — Hee-Yong Kim

(57) ABSTRACT

A device for nullifying images captured by drones utilizing a high power light to overexpose said images. One or more cameras installed in the device capture images of the area surrounding the device. Computer vision and deep learning are utilized to identify drones in the captured images. If a drone is identified, the location thereof is estimated. A high power light installed in the device is directed at the estimated location of the drone to overexpose any images that are being taken of the area around the device by the drone.

22 Claims, 3 Drawing Sheets

METHOD AND APPARATUS FOR OVEREXPOSING IMAGES CAPTURED BY DRONES

FIELD OF THE INVENTION

This invention relates to methods and apparatuses for preventing drones from capturing images of private spaces.

BACKGROUND OF INVENTION

Recreational use of drones in residential areas is becoming increasingly popular while regulation of such devices is slow to adapt. As a result, drones can be used to capture images and video of private residences and people on private property without their consent. Currently, there are few ways to prevent drones from capturing images and video of private property all of which are inefficient and unreliable. A need exists for a reliable means for protecting privacy from drones.

SUMMARY

The following present a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

The present invention introduces a drone disabling device for preventing a drone from capturing images or video of a surrounding area. A weatherproof housing holds one or more cameras positioned such that they have a 180 degree view all around. The cameras capture images of the sky and the images are analyzed to identify drones. If a drone is found in the images, a processor determines the location of the drone relative to the device and then directs a high power light toward the drone, causing any pictures taken by the drone to be so overexposed that no or virtually no detail of the area surrounding the drone disabling device can be discerned in the images. Kalman filtering is used to predict the trajectory of the drone. The high power light is shined along the estimated trajectory so as to continuously disable the drone while it is in the field of view of the camera or cameras.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

DETAILED DESCRIPTION OF THE INVENTION

Figure 1A:
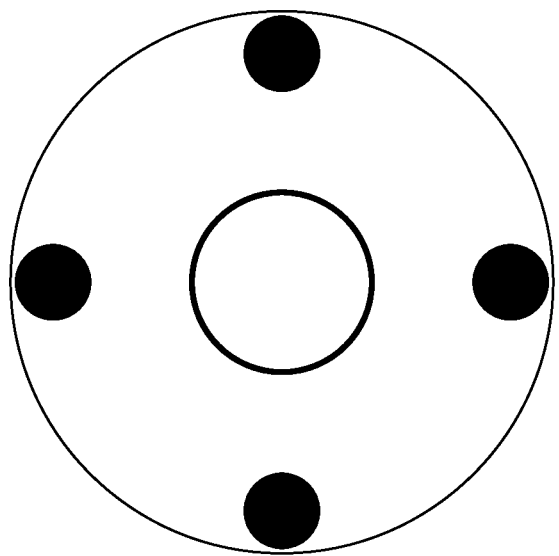
Referring to FIG. 1A, an overhead view of an example device is illustrated.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

The term "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

The term "image" or "images" shall be intended to include all image types and capturing capabilities including but not limited to video, videos, photography, photographs, images, infrared imaging or video and the like.

The present invention introduces a device that will overexpose images taken by a drone when a drone is attempting to take images of a private residence or structure. A drone disabling device is comprised of a weatherproof housing that holds one or more cameras, a processor, and a high power multidirectional collimated light beam. Various embodiments may employ multiple combinations of the number of cameras utilized including but not limited to one, two, three or more cameras to achieve the desired result. In the preferred embodiment, the field of view of all the cameras combined is at least 180 degrees. However, systems with a narrower or wider field of view may also work to some extent. A camera arrangement yielding a field of view greater than 180 degrees is also possible. The greater the combined field of view of the cameras, the more effective the system will be.

The cameras capture images of the surroundings, which includes buildings, structures, birds, planes, drones, animals, helicopters, individuals, trees, shrubs, the sky and the like.

In the preferred embodiment, the device will utilize computer vision and deep machine learning in order to differentiate between the different items captured. For instance, when focusing on the sky, the device will need to be able to differentiate between a bird or planes and a drone in order to prevent interference with an airplane or harm to wildlife. Once an image is captured, the captured images are sent to the processor. The processor uses computer vision and deep learning to detect drones in the images. Upon identifying a drone, the processor estimates a location of the drone relative to itself.

Various methods may be employed to estimate a location of a drone. In some embodiments, x and y coordinates of the location of the drone on images taken at a same time interval are identified. (In embodiments with only one camera, only one image per time interval is captured. In embodiments with two cameras, two different images per time interval are captured, and two sets of coordinates are obtained. In embodiments with three cameras, three sets of coordinates are obtained, and so on.) A pre-supplied table is consulted that correlates possible drone locations with the coordinates. (Possible drone locations relate to possible locations of the drone in 3D space.) If only one set of coordinates is used, there may be multiple locations at which the drone could be located, which will be identified by the table. When two or more sets of coordinates are used, possible locations that are not common to all the sets of coordinates can be eliminated. In this way, the possible location of the drone is narrowed to only a few possibilities. As time moves to a next interval and the drone changes locations, possible locations of the drone can further be eliminated until a single location of the drone can be identified with a good amount of certainty. (Therefore, embodiments with more cameras that capture the drone from different angles may be able to discern a single estimated location of the drone with a high degree of certainty faster than embodiments with fewer cameras.) The pre-supplied table is created and calibrated in advance during manufacture of the device.

In another embodiment, careful consideration will be utilized in ensuring that the device does not cause a nuisance to neighbors and that lights will not shine through a neighbor's windows for prolonged periods of time.

Once a single estimated location of the drone is identified, the high power light is turned on and directed at that location.

Kalman filtering is used to estimate the trajectory of the drone, and the high power light is directed to project the light along the estimated trajectory. A motor connected to the high power light allows the light to be pointed at any position within the field of view of the device.

When the high power light is pointed at the drone, it has the effect of 'blinding' any drone cameras. When a high power light is directed at the drone while it is capturing an image of an area, the source of the high power light and surrounding area will be overexposed. The degree of overexposure of the source and surrounding area is dependent in part on the power of the light. A very powerful light may cause the entire frame of the image to be overexposed so much that no meaningful detail can be discerned from the image. A less powerful light may cause a smaller area surrounding the device to be overexposed. Various embodiments may be envisioned that incorporate lights of varying powers.

One important aspect of the invention is that the high power light does not damage drones or drone cameras. Drones may move out of range of the device and continue operating as normal, producing normal quality images.

In some embodiments, the device will be able to identify whether or not the drone is capturing images of the home or if it is just passively flying around.

In some embodiments, the device is physically installed on a structure.

In other embodiments, the device may be on a track. The track will be installed on the structure. Movement tracking software will be installed along with a motor. When the drone moves, the camera will track this movement and locate the drone. If movement of the device is required, the invention will travel along the track to the most optimal location in order to interfere with the drone's image.

The device may utilize solar power, batteries, a plug or other means of being powered.

Referring to FIG. 1A, an overhead view of an example device is illustrated. In this example, a weatherproof housing contains 4 cameras that together cover a field of view of at least 180 degrees and a high power light.

Figure 1B:
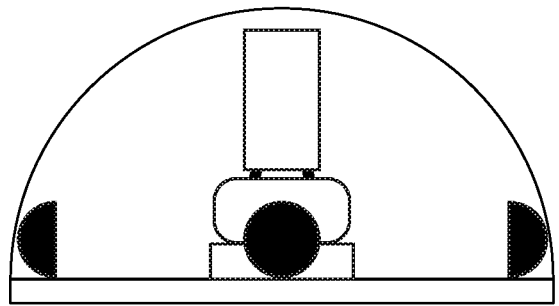
Referring to FIG. 1B, a side view of an example device is illustrated.

Referring to FIG. 1B, a side view of an example device is illustrated. In this example, the weatherproof housing contains the cameras, high power light, a battery to power the device, a processor (not shown), and a motor to move the high power light so that it may be directed at a drone.

Figure 2:
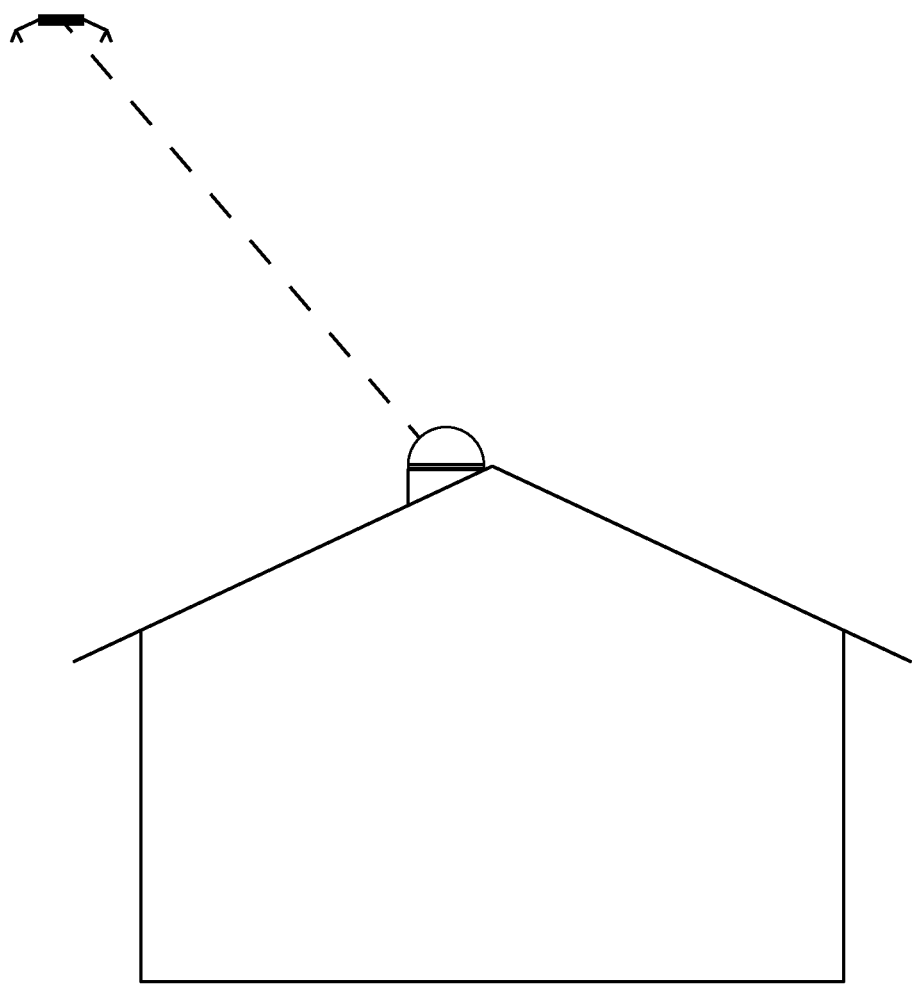
FIG. 2 illustrates an example of a device mounted on a structure which in this example is a house.

FIG. 2 illustrates an example of a device mounted on a structure which in this example is a house. A drone is in the field of view of the device, so the high power light is directed at the drone along the line.

Figure 3:
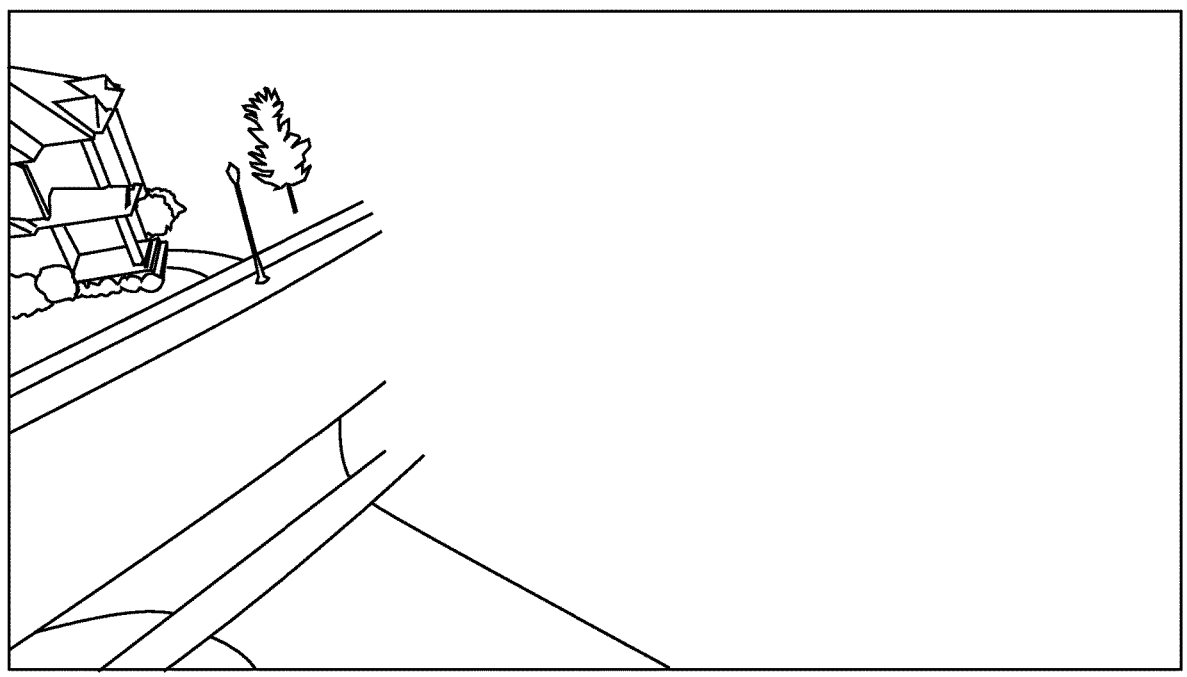
FIG. 3 is an example which illustrates an image captured by a photography drone when a high power light is shined at it.

FIG. 3 is an example which illustrates an image captured by a photography drone when a high power light is shined at it. The blank (overexposed) area is the source of the high power light and the area surrounding it.

While this invention has been described in terms of several embodiments, there are alterations, permutations, and equivalents, which fall within the scope of this invention. It should also be noted that there are many alternative ways of implementing the methods, devices and apparatuses of the present invention. Furthermore, unless explicitly stated, any method embodiments described herein are not constrained to a particular order or sequence. Further the Abstract is provided herein for convenience and should not be employed to construe or limit the overall invention, which is expressed in the claims. It is therefore intended that the following appended claims to be interpreted as including all such alterations, permutations, and equivalents as fall within the true spirit and scope of the present invention.

I claim:

1. A method for overexposing images captured by a drone comprising:
   providing a drone protection device within an environment, comprising:
   a housing;
   a camera disposed within the housing;
   a movable high power light source;
   a motor coupled to the high power light source; and
   a processor for detecting flying drones in captured images of the environment;
   capturing, with the camera, an image of the environment;
   detecting, with the processor, a drone in the captured image;
   activating, with the processor, a light beam of the high power light source when a drone is detected in the captured image; and actuating, with the processor, the motor to direct a light beam of the high power light source towards the drone such that images captured by the drone are overexposed.

2. The method of claim 1 wherein the drone protection device comprises multiple cameras for capturing images.

3. The method of claim 1 wherein the camera has a field of view of 180 degrees or less.

4. The method of claim 1 wherein the camera has a field of view of 180 degrees or more.

5. The method of claim 1 wherein the light beam is a high power multidirectional collimated light beam.

6. The method of claim 1 wherein the processor utilizes computer vision and deep machine learning in order to identify drones in the captured image.

7. The method of claim 1 wherein the drone protection device comprises multiple high power light sources.

8. The method of claim 1 wherein the processor identifies x and y coordinates of a location of the drone in the captured images.

9. The method of claim 8 wherein the processor uses a pre-supplied table that correlates possible drone locations with the coordinates identified in the captured images.

10. The method of claim 1 wherein the light beam is directed based on a trajectory of the drone estimated utilizing Kalman filtering.

11. The method of claim 10 wherein the motor allows the light beam to be pointed at any position within a field of view of the camera.

12. A device for overexposing images captured by drones comprising:
a weatherproof housing comprising:
one or more cameras for capturing images of an area surrounding the device;
a movable high power light source;
a motor to move the high power light source;
a processor configured to:
detect a drone in images captured by the one or more camera;
activate a light beam of the high power light source when a drone is detected in the images captured; and
actuate the motor to direct a light beam of the high power light source towards the drone such that images captured by the drone are overexposed; and
a power supply to supply power to the device.

13. The device of claim 12 further comprising multiple cameras.

14. The device of claim 12 wherein the one or more camera captures a field of view of 180 degrees or less.

15. The device of claim 12 wherein the one or more camera captures a field of view of 180 degrees or more.

16. The device of claim 12 wherein the light beam is a high power multidirectional collimated light beam.

17. The device of claim 12 wherein the processor utilizes computer vision and deep machine learning in order to identify drones in the images captured.

18. The device of claim 12 further comprising multiple lights sources.

19. The device of claim 12 wherein the processor determines x and y coordinates of a location of the drone in the images captured.

20. The device of claim 19 wherein the processor uses a pre-supplied table that correlates possible drone locations with the coordinates identified in images captured.

21. The device of claim 12 wherein the light beam is directed based on a trajectory of the drone estimated utilizing Kalman filtering.

22. The device of claim 21 wherein the motor allows the light beam to be pointed at any position within the field of view of the one or more camera.

* * * * *